(12) United States Patent
Richards et al.

(10) Patent No.: US 7,057,674 B2
(45) Date of Patent: Jun. 6, 2006

(54) PROJECTION DISPLAY WITH FULL COLOR SATURATION AND VARIABLE LUMINOSITY

(75) Inventors: Peter W. Richards, Palo Alto, CA (US); Andrew G. Huibers, Mountain View, CA (US); Gregory R. Muir, Mountain View, CA (US)

(73) Assignee: Reflectivity, INC, Sunnyvale, CA (US)

( * ) Notice: Subject to any disclaimer, the term of this patent is extended or adjusted under 35 U.S.C. 154(b) by 463 days.

(21) Appl. No.: 10/044,451

(22) Filed: Jan. 11, 2002

(65) Prior Publication Data

US 2002/0105729 A1    Aug. 8, 2002

Related U.S. Application Data

(60) Provisional application No. 60/266,780, filed on Feb. 6, 2001.

(51) Int. Cl.
*H04N 9/12* (2006.01)
(52) U.S. Cl. .................. 348/743; 348/742; 348/272; 348/273
(58) Field of Classification Search ................ 348/742, 348/743, 65, 70, 272, 273, 276–279; 359/459, 359/127–132, 588–590, 226, 209, 634, 636
See application file for complete search history.

(56) References Cited

U.S. PATENT DOCUMENTS

| | | | | |
|---|---|---|---|---|
| 2,339,256 A | * | 1/1944 | Doncaster ................... 348/743 |
| 2,417,621 A | * | 3/1947 | Traub ......................... 348/743 |
| 3,272,506 A | * | 9/1966 | Lescher ........................ 472/72 |
| 5,103,301 A | * | 4/1992 | Cosentino ................. 348/217.1 |
| 5,650,832 A | * | 7/1997 | Poradish et al. ............. 348/743 |
| 5,921,650 A | * | 7/1999 | Doany et al. ................. 353/31 |
| 6,024,453 A | * | 2/2000 | Edlinger et al. .............. 353/84 |
| 6,147,720 A | * | 11/2000 | Guerinot et al. ............. 348/744 |
| 6,359,662 B1 | * | 3/2002 | Walker ........................ 348/743 |
| 6,392,717 B1 | * | 5/2002 | Kunzman .................... 348/744 |
| 6,467,910 B1 | * | 10/2002 | Sato ............................. 353/84 |
| 6,520,644 B1 | * | 2/2003 | Lee .............................. 353/31 |
| 6,536,904 B1 | * | 3/2003 | Kunzman .................... 353/31 |
| 6,771,325 B1 | * | 8/2004 | Dewald et al. ............. 348/743 |

* cited by examiner

*Primary Examiner*—John Miller
*Assistant Examiner*—Trang U. Tran
(74) *Attorney, Agent, or Firm*—Gregory R. Muir

(57) ABSTRACT

A color wheel is disclosed that has at least one segment that occupies, for a given radius, a percentage of the circumference of the wheel at that radius, which percentage varies continuously or in multiple steps from a radially inward point to a radially outer point on the wheel. In one embodiment, the color wheel has a plurality of filter segments adjacent each other around the circumference of the wheel, wherein at least one of the transitions from one filter segment to the next is curved or stepped.

A color wheel also is disclosed that has a plurality of filter segments adjacent each other around the circumference of the wheel, wherein at least one of the segments is a higher brightness segment than the others and has sides facing adjacent filter segments that do not lie on the radius of the wheel. A projection system is also disclosed that has a light source, a unique color wheel, a spatial light modulator, and projection optics.

45 Claims, 6 Drawing Sheets

PROJECTION DISPLAY WITH FULL COLOR SATURATION AND VARIABLE LUMINOSITY

This application claims benefit from U.S. provisional application No. 60/266,780 to Richards et al. filed Feb. 6, 2001, the subject matter of which being incorporated herein by reference. The present invention relates to color wheels for projection systems. More particularly, the present invention relates to a projection system having variable luminosity, a projection system utilizing a unique color wheel, and new color wheel designs. The invention is related to U.S. patent application Ser. No. 09/564,069 filed May 3, 2000 to Richards, the subject matter of which is incorporated herein by reference.

BACKGROUND

1. Field of Invention
2. Related Art

In U.S. Pat. No. 5,680,180 to Huang, a color wheel for a spatial light modulator projection system is disclosed having one green, one red and one blue portion on the wheel. If the color is out of balance, the length of one of the color segments, or the wavelength range of the color segment, can be altered to improve color balance.

In U.S. Pat. No. 5,448,314 to Heimbuch et al., color wheels are disclosed that reduce perceived color separation. One disclosed color wheel has two segments each of red, green and blue, whereas another disclosed wheel has one red, one blue and two green segments.

In U.S. Pat. No. 6,147,720 to Guerinot et al. discloses a projection system with two light sources and a single color wheel. The color wheel can be red, green, blue, cyan, magenta and yellow, or the wheel could be blue cyan and green, or green, cyan, green and blue, depending upon the type of light source and whether the light is reflected or transmitted.

In U.S. Pat. No. 5,650,832 to Poradish et al., discloses a color wheel movable in and out of the path of the light beam, in order to increase brightness of the projected image with a trade-off in color saturation. Also disclosed is a wheel with six segments, three being located radially outward from the other three and having different color saturation values from the inner three segments.

In U.S. Pat. No. 5,233,385 to Sampsell, a color wheel is disclosed that has four segments—green, blue, red and white (clear), with the white segment allowing for adding a base level of brightness, which is not controlled. In U.S. Pat. No. 6,054,832 to Kunzman et al, one or two white segments can be used selectively depending upon the frame brightness.

U.S. Pat. No. 5,868,482 to Edlinger et al. discloses structure and features of a prior art color wheel and projection system, the subject matter of which is incorporated by reference.

SUMMARY OF THE INVENTION

The present invention is directed to unique color wheels that allow for varying the luminosity of a projection system. In addition, the present invention is directed to a projection system using a color wheel having such characteristics. Also disclosed is a projection system that allows for changing the brightness or color saturation of the projected image by changing the location of the color wheel relative to the light beam passing therethrough.

The present invention is directed to a color wheel comprising at least one segment that occupies, for a given radius, a percentage of the circumference of the wheel at that radius, which percentage varies depending upon the radius of the wheel. The color wheel can have a plurality of filter segments adjacent each other around the circumference of the wheel, and at least one of the transitions from one filter segment to the next is curved or stepped. In one embodiment, the color wheel has a plurality of filter segments adjacent each other around the circumference of the wheel, and one of the segments is a higher brightness segment than the others and has sides facing adjacent filter segments that do not lie on the radius of the wheel.

DETAILED DESCRIPTION

Figure 1A:
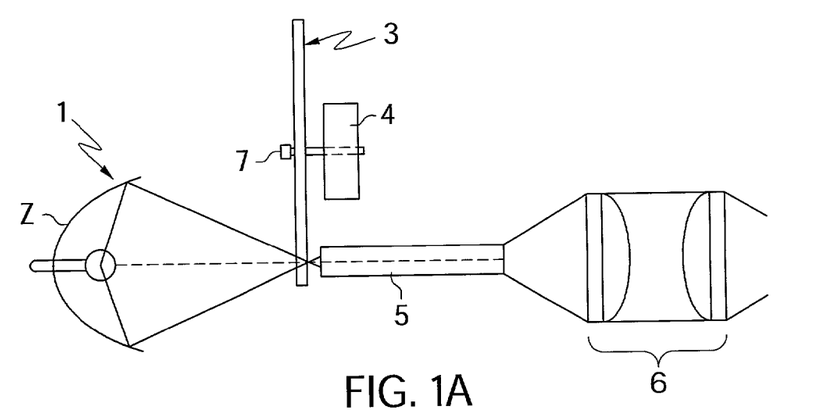
FIG. 1 illustrates a projection system layout using a color wheel of the present invention.
Figures 2A, 2B, 2C:
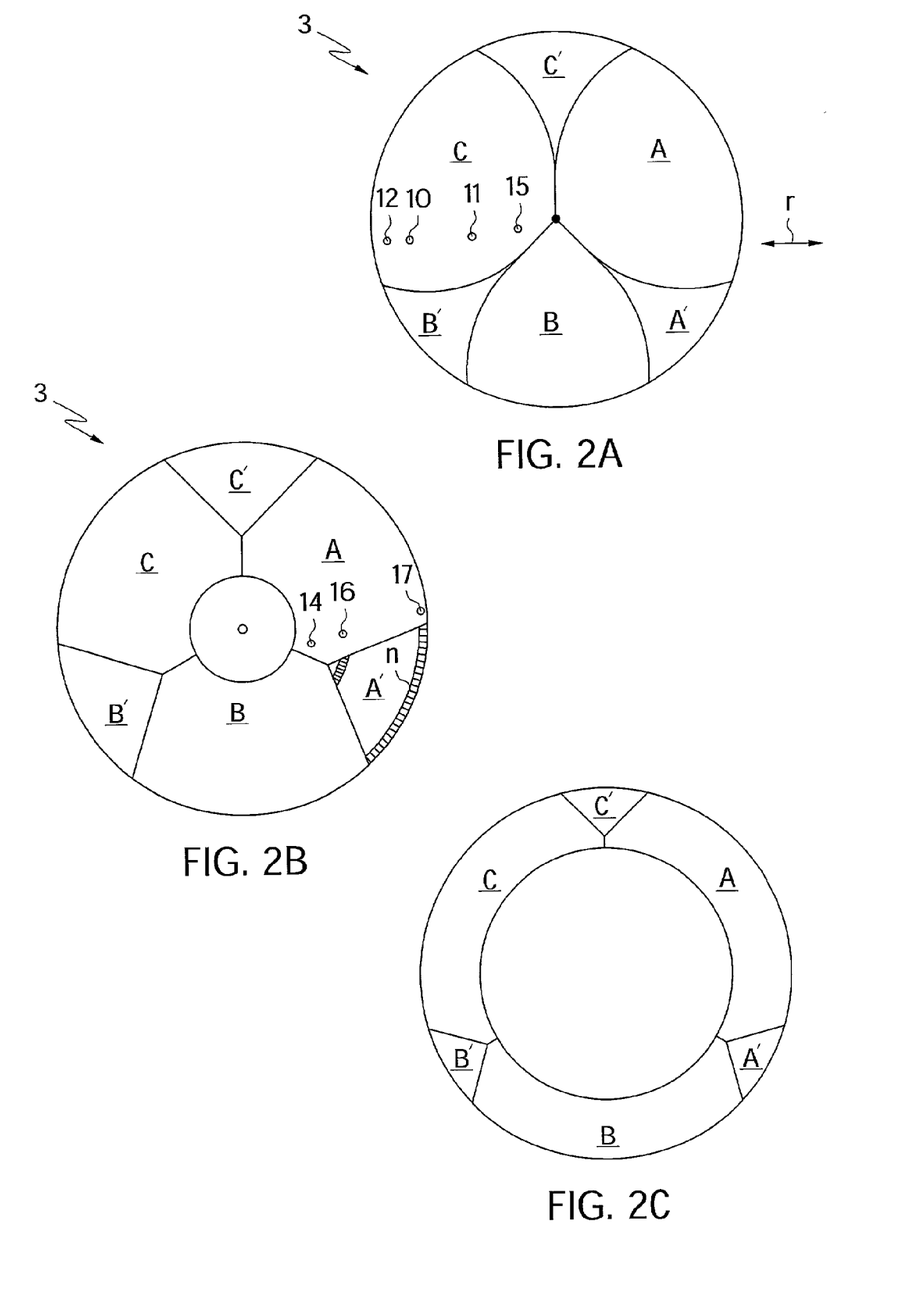
FIG. 2A is an illustration of solid color wheel with curved sections.
FIG. 2B is an illustration of a color wheel having a portion removed in the center and straight color sections.
FIG. 2C is a color wheel of the invention having an overall shape similar to traditional color wheels.

As can be seen in the projection system illustrated in FIG. 1A, a light source 1 is provided that can be an arc lamp with an elliptical reflector 2 for focusing light onto color wheel 3. A motor 4 rotates the color wheel via a central drive shaft 7, through the light beam projected from light source 1. A light pipe 5 is provided to more evenly disperse the light beam, and optics 6 are provided to direct and project the light beam to a target. When the wheel is not being rotated, the light, in this embodiment, passes through the color wheel at a point 10, as illustrated in FIG. 2A. The light source 2 is provided, which can be an arc lamp as in the prior art. The light source of the present invention can be a source of white light such as from a xenon arc lamp, or a different type of light source, such as a UHP arc lamp, a halogen lamp, a white light laser, or any other suitable white light source could also be used.

Figure 1B:
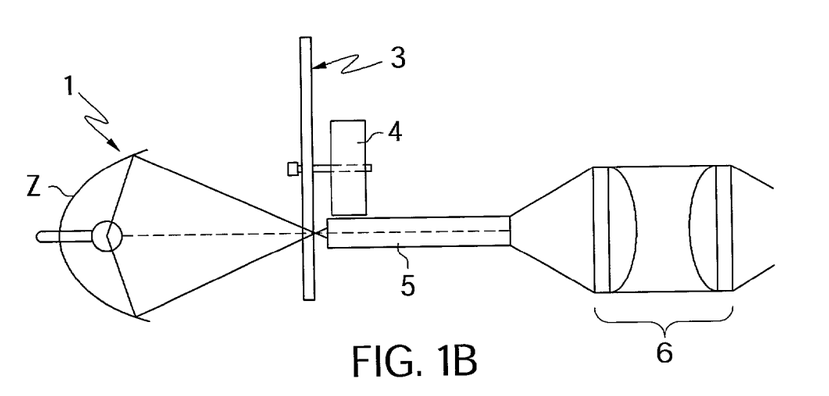
Figure 1C:
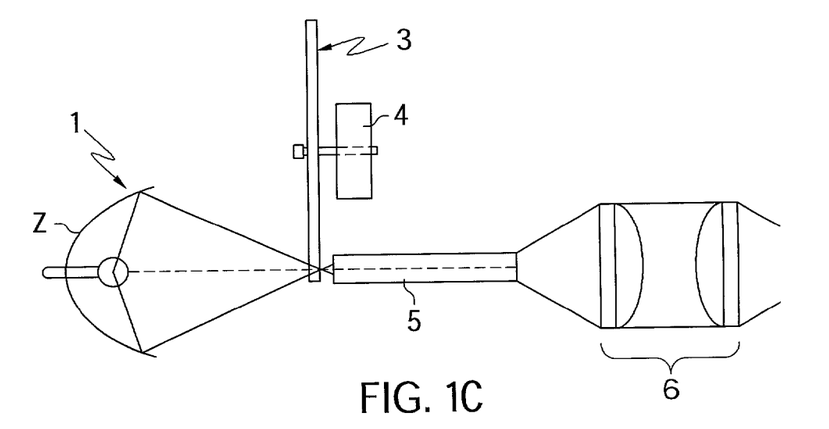
Figure 1D:
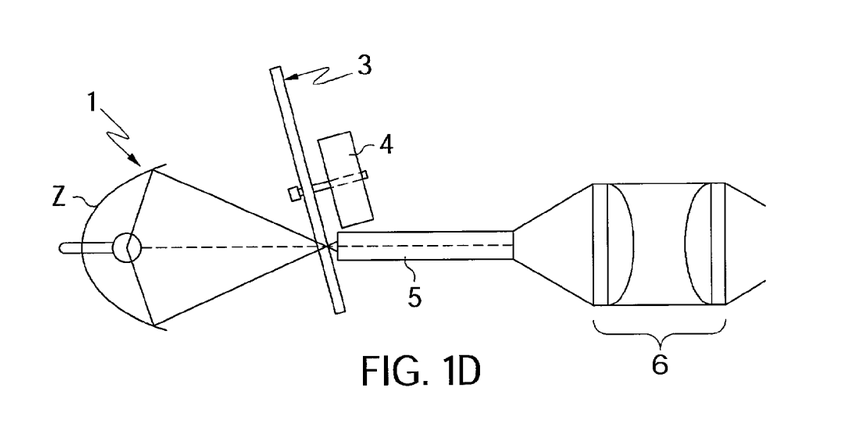
Figure 1E:
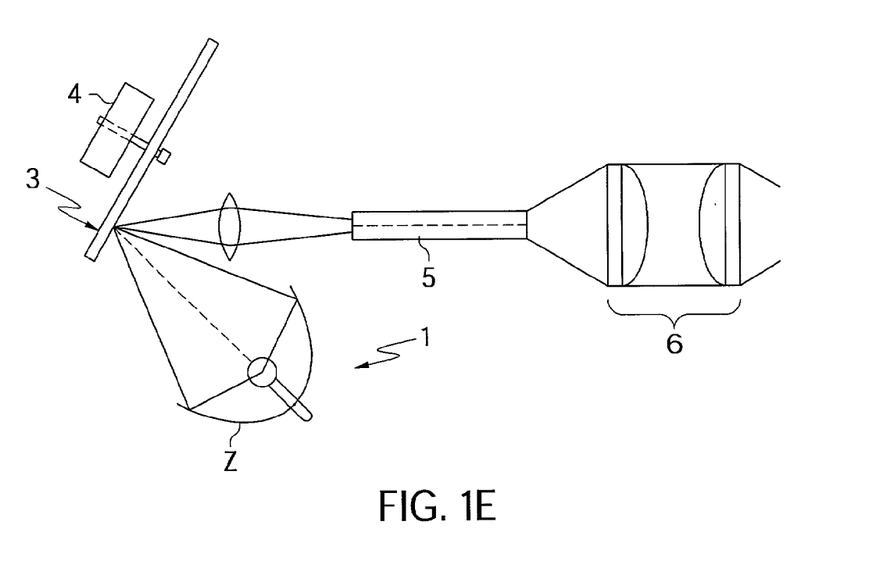

As can be seen in FIGS. 1B to 1D, the color wheel can be displaced so that the light beam passes through a different circular "slice" of the wheel. As can be seen in FIG. 1B, the color wheel is moved radially so that the light beam passes through a more radially inward portion of the color wheel. If the wheel is motionless, this point would correspond to point 11 in FIG. 2A, whereas. In FIG. 2C, the color wheel is moved so that the light passes through a far radially outward point of the wheel, corresponding to point 12 in FIG. 2A. FIG. 1D, on the other hand, shows that the color wheel can be pivoted rather than moved radially, to achieve a different light beam position through the color wheel. FIG. 1E is an embodiment where the light is reflected rather than transmitted by the color wheel (and likewise would be moved radially, pivoted, or otherwise altered in position).

As can be seen in FIG. 2A, color wheel filter segments A, B and C are provided, which can correspond to light centered around a different wavelength for each segment. As an example, segments A, B and C could correspond to red, green and blue filters. Additional filter segments for providing colors could be used (e.g. segments A, B, C and D) where the additional one or more colors could be an additional color or spectral distribution, e.g., for expanding the color gamut or increasing brightness or both. Or, if the wheel is used for reflection as in FIG. 1E, the wheel segments could be yellow, magenta and cyan.

As can also be seen in FIG. 2A, additional segments A', B' and C' are provided for altering the luminosity vs. color saturation of the image transmitted or reflected from the color wheel. Segments A', B' and C' could be white segments (e.g. transparent segments for passing white light from the white light source), or highly reflective segments (e.g. mirror segments) for the reflection embodiment. Not only "white" segments could be used for segment A', B' and C'. Segments that correspond to segments A, B and C but that have higher luminosity and lower color saturation, or that have a lower luminosity and higher color saturation, could be used. For example, segment A' could be a filter that passes all red wavelengths and less than all of green and blue; segment B' could be a filter than passes all green wavelengths and less than all of blue and red; and C' could be a filter that passes all blue wavelengths and less than all of red and green. In appearance, filters A', B' and C' could be pink, light blue and light green, or otherwise pastel in color depending upon the wavelengths selected.

As can be further seen in FIG. 2A, if the wheel is rotated around central point (drive shaft) 7, a light beam 15 will pass through only segments A, B and C. Assuming segments A, B and C are the lower luminosity, higher color saturation segments (rather than segments A', B' and C'), then the image projected through the wheel will have full color saturation, or at least high color saturation depending upon the filters selected. If the wheel is moved (e.g. radially in direction "r") so that it passes through the wheel at point 11, then a small portion of color wheel segments A', B' and C' will pass across the light beam. If these segments A', B' and C' are white segments or segments of less saturated color and higher luminosity, then the output image will be brighter (though less saturated in color) due to this positional change of the color wheel. Because the filter segments having the different luminosity and color saturation (A', B' and C') do not occupy the same percentage of the wheel from point 15 to point 12 (that is, along the radius of the color wheel), moving from 15 to 12 allows a different, possibly brighter group of colors to be selected.

Likewise in FIG. 2B, segments A', B' and C' each occupy a lower percentage of the wheel (circumferentially) at a radially inward part of the wheel compared to a radially outward part of the wheel. Taking wheel segment A' as an example, a light beam 16 will pass through portion 18 of segment A', whereas a light beam 17 will pass through portion 19 of segment A'. Because portion 19 is a greater percentage of the circle of which it is a segment, than portion 18 is of the circle of which portion 18 is a segment, the relative movement of the light beam from point 16 to point 17 will allow for more time per frame allotted to segment A'. Thus, if segments A, B and C are red, green and blue, and segments A', B' and C' are white (transparent) segments, then a light beam passing through the color wheel at point 14 can result in a fully color saturated frame (one frame being equal to one rotation of the wheel) where no white segments pass through the light beam-whereas a light beam passing through the color wheel at point 17 can result in higher brightness of the frame, though with a corresponding decrease in color saturation. FIG. 2C is similar to FIG. 2B, but shows a more traditional ring-like color wheel as often used in color projection systems. Though any size is possible, a diameter of from 40 to 140 mm is preferred, with a motor that allows for an operating speed of from 3600 rpm to 10800 rpm (other speeds are possible as long as they are sufficiently fast so that the sequential colors appear as a combined color when viewed.

Figure 3A:
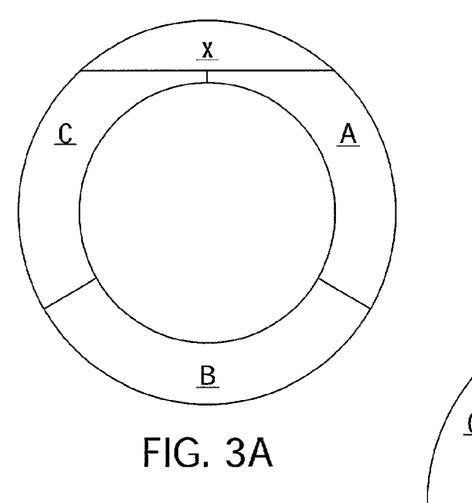
FIGS. 3A to 3D are examples of color wheels of the invention having a single area that occupies a different percentage of the wheel along the radius of the wheel.
Figure 3B:
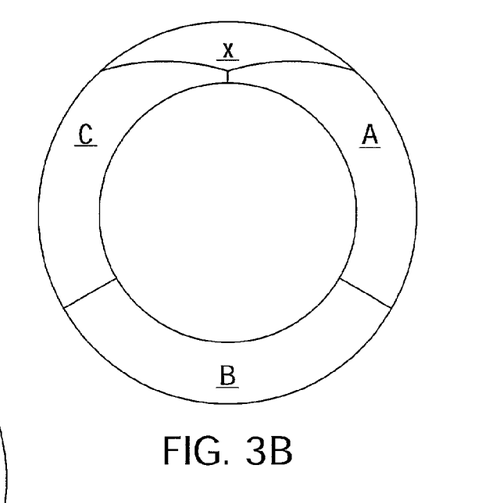
Figure 3C:
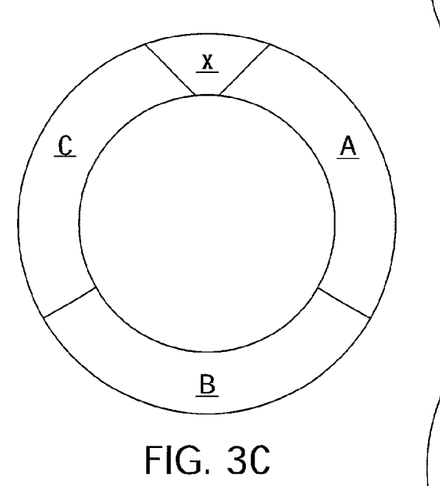

FIGS. 3A to 3C illustrate other color wheel designs of the present invention. In these embodiments, only one segment X of different color saturation and luminosity is provided (e.g. a white, yellow or orange segment). However, it should be noted that the segment X could be provided more than once, such as at three different points along the wheel as in FIGS. 2A to 2C. The embodiments of FIGS. 3A and 3B allow for a great variation in luminosity vs. color saturation (at the circumferentially outermost part of the wheel, the variable segment X occupies almost ¼ of the wheel. Segment X could be designed to occupy an even greater percentage of the wheel, though if the segment is a white segment, it would be unlikely that the segment would be made greater than 25 percent due to the corresponding loss in color saturation.

Figure 3D:
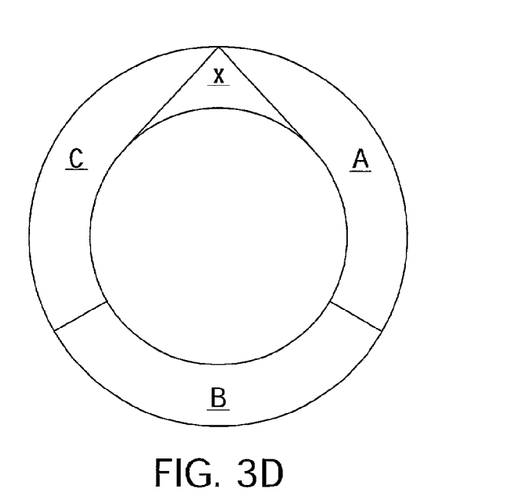
Figure 4A:
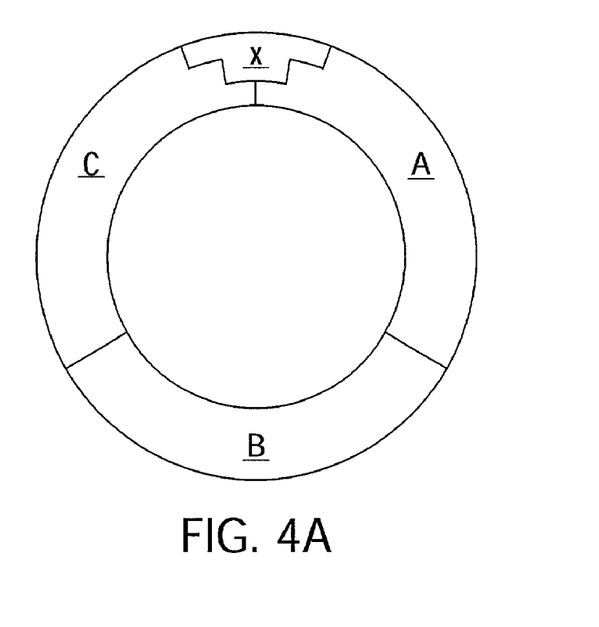
FIGS. 4A and 4B are illustrations of examples of the color wheel of the invention where the segment that occupies a different percentage of the wheel along the radius of the wheel has a stepped configuration.
Figure 4B:
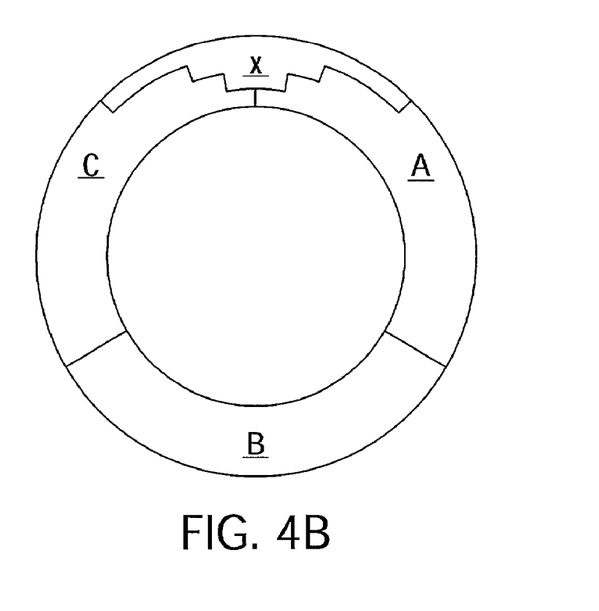

FIG. 3C is an illustration of yet another color wheel, where segment X extends along the entire width of the color wheel. If segment X is a white segment, full color saturation is not available (unless the light source is turned off for the time period corresponding to segment X). In some situations, it may not be necessary to provide full color saturation. As can be seen in FIG. 3D, the change in the amount of real estate occupied by segment X need not increase only in a radially outward direction, but could, in fact, increase in a radially inward direction. FIGS. 4A and 4B are illustrations of yet further embodiments of the invention where the trade-offs in luminosity vs. color saturation are made stepwise (three different possible settings in FIG. 4A and four possible settings in FIG. 4B).

Figure 5A:
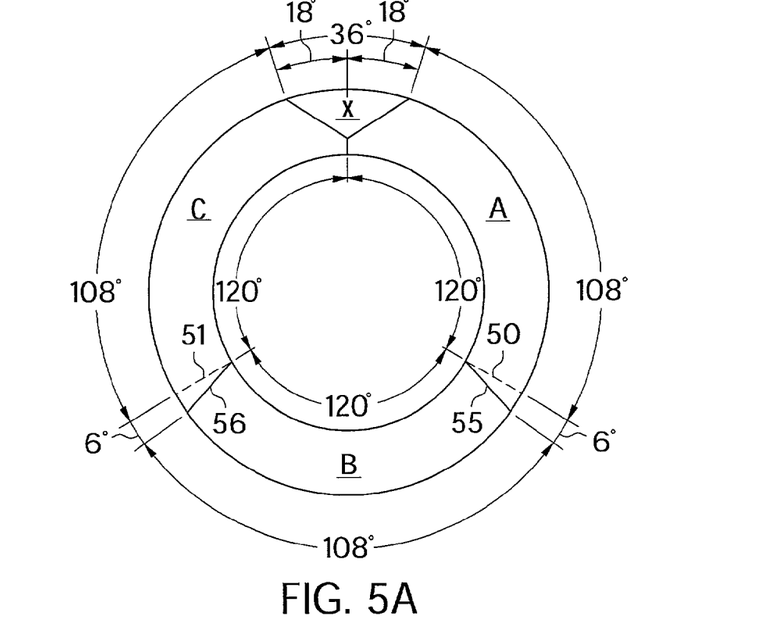
FIGS. 5A and 5B are examples of color wheels where the lengths of other segments of the wheel are altered to accommodate the variable segment having a different color or color saturation.
Figure 5B:
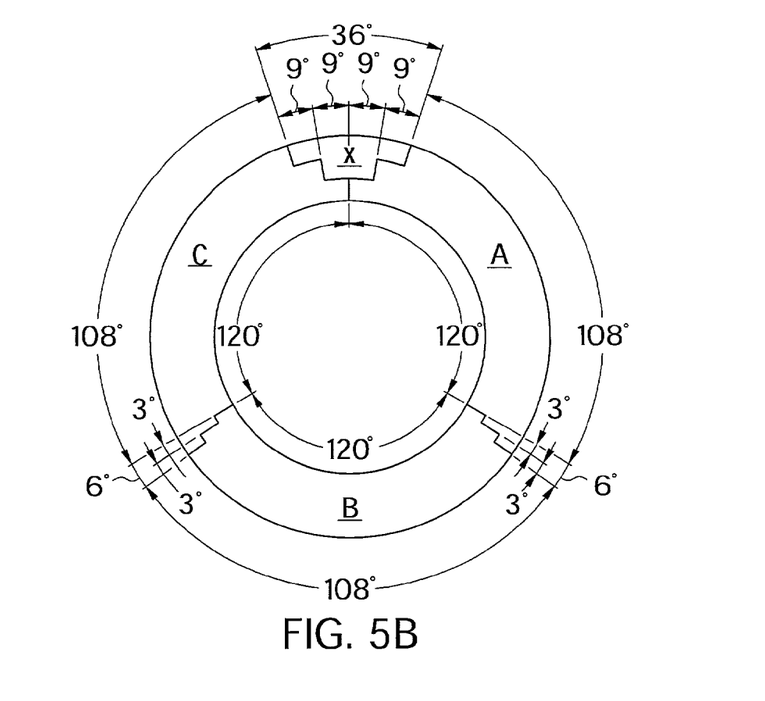

FIGS. 5A and 5B are illustrations of additional embodiments of the invention where the lengths of segments A, B and C change along the radius of the color wheel to reflect the presence of the segment X. For example, in both of these figures, segment X occupies 36 degrees of the color wheel at the most radially outward portion of the wheel. If the division between segments A and B, and between segments B and C are left as extending along the radius of the circle (e.g. as in FIGS. 3A to 3D and 4A and 4B), the length of both of segments A and C will be decreased by 18 degrees from the radially most inward to the radially most outward part of the color wheel, while segment B remains the same length. In order to rectify this (keep the color segments A to C the same relative to each other) and maintain proper color balance in the projection system, the line dividing A and B is shifted 6 degrees (at the radially outermost point) so that the dividing line is line 55 instead of dotted line 50 (likewise the line is preferably line 56 between segments B and C rather than dotted line 51). In this way, the percentage of the wheel that is occupied by segment X increases along the radius, yet the percentage of the wheel that each of segments A, B and C occupy, remains the same relative to each other regardless of where the light beam intersects the wheel (though decreased as a percentage of the total wheel circumference due to the existence of segment X).

Moving or tilting the color wheel so that the light beam intersects the color wheel at different points along the radius of the wheel, can be accomplished by any suitable mechanisms known in the art. In one embodiment, the motor housing is held on a rod, which rod is at a right angle to the shaft for rotating the color wheel. The entire motor, housing and color wheel can be moved along the radius of the color wheel so as to allow for changes in color saturation and brightness. The same could be accomplished by rotating the color wheel around a diameter of the wheel, or rotating where the drive shaft lies along the radius of the circle defined by the rotation (see FIG. 1D, for example). In any event, the movement of the color wheel relative to the light beam passing therethrough allows for a step-wise or continuous change in brightness vs. color saturation along the radius of the color wheel. This change in brightness (vs. color saturation) is accomplished by allotting gradually increasing (or decreasing) amounts of time per frame for a segment having higher luminosity and lower color saturation (e.g. a white or off-white segment for the transmissive embodiment and a highly reflective mirror segment for the reflective embodiment.

In a preferred embodiment, buttons or knobs are provided on the projector for manually adjusting the brightness (and color saturation) level. Whether the projection system is a boardroom-type projector, a projection television or a rear or front projection computer monitor, it is desirable that the user can manually alter the brightness and color saturation. In one embodiment, the brightness can be increased continuously (e.g. by turning a knob) while the color saturation decreases. In another embodiment, whether the wheel is capable of continuous variability or not, preset settings are selected by the user to achieve preselected trade-offs between color saturation and brightness.

It is also possible to incorporate a sensor that automatically adjusts the brightness/color saturation according to an input signal. For example, the sensor could indicate room light conditions and adjust the brightness accordingly. Also, detected background light level existing on the target screen could be used as the input signal. Or the content of the projected image/video feed could indicate whether to increase or decrease brightness levels by moving the light beam and color wheel relative to each other. Also, instead of a user making a direct mechanical adjustment to the projection system, the color saturation vs. brightness could be altered under remote computer control. If the projection system is a projection TV, this alteration could be accomplished via the TV remote. Or, if the projection system is a computer monitor, computer input can command the brightness change. It would also be desirable to have the ability to switch back and forth between the above modes.

It should also be noted that the color wheels need not have white segments of the same length (for those embodiments having multiple white segments). The white segments can have different lengths within the same wheel. Also, the color wheels need not be limited to red, green and blue. It is possible to expand the color gamut from the traditional RGB triangle to include one or more additional colors, such as cyan, magenta and/or yellow, with each color optionally having a white segment (or segment of higher brightness and lower color saturation) proximate thereto. A specific embodiment is to have four colors, e.g. red, yellow, green, blue, so that more of the color gamut perceivable by the human eye can be produced. This may be useful in a system where color reproduction is particularly important, for example in pre-press proofing.

There are many variations possible to the above specific embodiments. The color wheel of the present invention need not be round as in all the examples (other disk shapes are possible). Also, the segment for altering the brightness of the frame can be a missing segment from the wheel. In another embodiment, it is a substantially transparent glass or polymer segment, preferably of the same material as the remainder of the wheel.

The invention has been described in terms of specific embodiments. Nevertheless, persons familiar with the field will appreciate that many variations exist in light of the embodiments described herein.

We claim:

1. A color wheel comprising:
  a set of segments, one of which is constructed such that,
    when intersected by a first circle having a first radius and centered as the same center of the color wheel, a first arc of the first circle within said segment occupies a first percentage of the circumference of the first circle;
    when intersected by a second circle having a second radius and centered as the same center of the color wheel, a second arc of the second circle within said segment occupies a second percentage of the circumference of the second circle;
  wherein the first and second percentage are different;
  wherein the percentage increases in a stepwide manner from the radially outer point to a radially inward point.

2. The color wheel of claim 1, wherein the color wheel further comprises colored segments which comprise one red, one green and one blue segment.

3. The color wheel of claim 2, wherein the at least one segment is a white segment.

4. The color wheel of claim 2, wherein the colored segments further comprise a yellow, cyan and/or magenta segment.

5. The color wheel of claim 1, wherein the at least one segment is a clear glass or polymer.

6. The color wheel of claim 1, wherein the at least one segment comprises a transparent or translucent material or no material within that segment of the wheel.

7. The color wheel of claim 1, wherein the at least one segment does not extend completely across the width of the color wheel in the radial direction of the wheel.

8. The color wheel of claim 1, wherein the at least one segment provides higher brightness for each frame when the wheel is rotated in a projection system.

9. The color wheel of claim 1, wherein the at least one segment provides increased color saturation for each frame when the wheel is rotated in a projection system.

10. The color wheel of claim 1, further comprising at least three different filter segments in addition to the at least one segment.

11. The color wheel of claim 10, wherein the at least three different filter segments occupy, for a given radius, a percentage of the circumference of the wheel at that radius, which percentage remains the same from a radially inward point to a radially outer point on the wheel.

12. The color wheel of claim 10, wherein light passing through the at least three different filter segments is centered around a different wavelength for each segment.

13. The color wheel of claim 10, wherein the at least one segment is at least three segments having a different luminosity and color saturation than an adjacent one of said at least three different filter segments.

14. The color wheel of claim 13, wherein the at least three segments have a higher luminosity than the at last three different filter segments.

15. The color wheel of claim 14, wherein the at least three segments are interspersed between the at least three different filter segments.

16. The color wheel of claim 15, wherein the at least three segments are white or yellow segments.

17. A projection system comprising:
a light source;
the color wheel of claim 1;
a spatial light modulator; and
projection optics.

18. The projection system of claim 17, wherein the color wheel further comprises colored segments which comprise one red, one green and one blue segment.

19. The projection system of claim 18, wherein the at least one segment is a white segment.

20. The projection system of claim 18, wherein the colored segments further comprise a yellow, cyan and/or magenta segment.

21. The projection system of claim 17, wherein the at least one segment is a clear glass or polymer.

22. The projection system of claim 17, wherein the at least one segment comprises a transparent or translucent material or no material within that segment of the wheel.

23. The projection system of claim 17, wherein the at least one segment does not extend completely across the width of the color wheel in the radial direction of the wheel.

24. The projection system of claim 17, wherein the at least one segment provides higher brightness for each frame when the wheel is rotated in a projection system.

25. The projection system of claim 17, wherein the at least one segment provides increased color saturation for each frame when the wheel is rotated in a projection system.

26. The projection system of claim 17, further comprising at least three different filter segments in addition to the at least one segment.

27. The projection system of claim 26, wherein the at least three different filter segments occupy, for a given radius, a percentage of the circumference of the wheel at that radius, which percentage remains the same from a radially inward point to a radially outer point on the wheel.

28. The projection system of claim 26, wherein light passing through the at least three different filter segments is centered around a different wavelength for each segment.

29. The projection system of claim 26, wherein the at least one segment is at least three segments having a different luminosity and color saturation than an adjacent one of said at least three different filter segments.

30. The projection system of claim 29, wherein the at least three segments have a higher luminosity than the at last three different filter segments.

31. The projection system of claim 30, wherein the at least three segments are interspersed between the at least three different filter segments.

32. The projection system of claim 31, wherein the at least three segments are white or yellow segments.

33. The projection system of claim 17, wherein the spatial light modulator is a micromirror array.

34. The projection system of claim 17, wherein the light source is a white light source.

35. The projection system of claim 34, wherein the white light source is a halogen lamp, a xenon arc lamp, a UHP arc lamp or a white light laser.

36. The projection system of claim 17, wherein the projection system further comprises a target.

37. The projection system of claim 36, wherein the projection system is a front or rear screen television or computer monitor.

38. The projection system of claim 17, further comprising a housing and a knob or button for mechanically moving the color wheel so as to increase or decrease brightness.

39. A projector, comprising:
a light source producing a light beam;
a color wheel comprising a set of segments, depending& upon the relative positions of the color wheel to the light beam, the percentage of time that a particular one of the segments remains in the light beam when the wheel is spinning, changes relative to the other segments;
a spatial light modulator for modulating the light beam passing through the color wheel;
a display target on which the modulated light beam is projected so as to form a desired image; and wherein one of the boundaries of the adjacent segments extends stepwise.

40. The projector of claim 39, wherein the segments comprise a set of primary colors.

41. The projector of claim 40, wherein the primary colors are red, green, and blue.

42. The projector of claim 40, wherein the primary colors are yellow, cyan, and magenta.

43. The projector of claim 39, wherein one of the segment is clear to the light beam.

44. The projector of claim 39, wherein the boundaries of the adjacent segments are curved.

45. The projector of claim 44, wherein the neighboring boundaries are curved in opposite directions.

* * * * *

UNITED STATES PATENT AND TRADEMARK OFFICE
CERTIFICATE OF CORRECTION

PATENT NO. : 7,057,674 B2  Page 1 of 1
APPLICATION NO. : 10/044451
DATED : June 6, 2006
INVENTOR(S) : Richards et al.

It is certified that error appears in the above-identified patent and that said Letters Patent is hereby corrected as shown below:

Column 8, line 22, depending& should read– depending.

Signed and Sealed this

Twenty-ninth Day of August, 2006

JON W. DUDAS
*Director of the United States Patent and Trademark Office*